(12) United States Patent
Lai et al.

(10) Patent No.: US 10,533,097 B2
(45) Date of Patent: Jan. 14, 2020

(54) COATING COMPOSITION

(71) Applicant: Hexion Inc., Columbus, OH (US)

(72) Inventors: Zhen Lai, Sugar Land, TX (US); Mark Clark, Eugene, OR (US); Kali Wallenta, Houston, TX (US); Carlos Nuila, Houston, TX (US)

(73) Assignee: HEXION INC., Columbus, OH (US)

( * ) Notice: Subject to any disclaimer, the term of this patent is extended or adjusted under 35 U.S.C. 154(b) by 120 days.

(21) Appl. No.: 15/710,671

(22) Filed: Sep. 20, 2017

(65) Prior Publication Data
US 2019/0085178 A1  Mar. 21, 2019

(51) Int. Cl.
C09K 21/14 (2006.01)
C09D 5/18 (2006.01)

(52) U.S. Cl.
CPC ............. C09D 5/185 (2013.01); C09K 21/14 (2013.01)

(58) Field of Classification Search
CPC ................................. C09K 21/14; C09D 5/185
See application file for complete search history.

(56) References Cited

U.S. PATENT DOCUMENTS

| 2,722,523 A | 11/1955 | Gilchrist et al. |
| 3,955,987 A | 5/1976 | Schaaf et al. |
| 4,247,435 A | 1/1981 | Kasten |
| 4,594,368 A | 6/1986 | Salyer et al. |
| 5,739,173 A | 4/1998 | Lutter et al. |
| 5,968,669 A | 10/1999 | Liu et al. |
| 6,084,008 A | 7/2000 | Liu |
| 6,245,842 B1 | 6/2001 | Buxton et al. |
| 7,217,753 B2 | 5/2007 | Sinclair |
| 8,808,850 B2 | 12/2014 | Dion et al. |
| 9,097,011 B1 | 8/2015 | Barone et al. |
| 2006/0142421 A1* | 6/2006 | Ihara ........................ C08K 9/04 523/205 |
| 2007/0284120 A1 | 12/2007 | Rowen |
| 2009/0326117 A1* | 12/2009 | Benussi .................... C09K 3/10 524/183 |
| 2010/0197828 A1 | 8/2010 | Whaley |
| 2013/0005896 A1* | 1/2013 | Jain ........................ C01B 32/225 524/496 |
| 2013/0101839 A1 | 4/2013 | Dion |
| 2015/0020476 A1* | 1/2015 | Winterowd ............... C09D 7/61 52/837 |
| 2017/0029632 A1* | 2/2017 | Couturier ............. C09D 109/08 |
| 2017/0120473 A1* | 5/2017 | Zhang ..................... B27K 3/163 |
| 2017/0225429 A1* | 8/2017 | Yu .............................. B32B 5/18 |
| 2018/0119417 A1* | 5/2018 | Li ............................. E04B 1/942 |
| 2018/0266048 A1* | 9/2018 | Martin ................... D06M 11/74 |
| 2019/0061313 A1* | 2/2019 | Yao ......................... B32B 5/022 |

FOREIGN PATENT DOCUMENTS

WO    WO1991011498    8/1991

* cited by examiner

Primary Examiner — Ellen M McAvoy

(57) ABSTRACT

A coating composition comprising: a) a first expandable graphite compound having a mean particle size in the range of from 300 microns to 1000 microns; b) a second expandable graphite compound having a mean particle size in the range of from 0.5 microns to 250 microns; c) a binder comprising: i) a thermoplastic compound and ii) a thermoset compound; d) a catalyst; and e) a blowing agent, is disclosed.

11 Claims, No Drawings

COATING COMPOSITION

FIELD OF THE INVENTION

This invention relates to coating compositions. In particular, this invention relates to flame-retardant, intumescent coating compositions.

BACKGROUND OF THE INVENTION

Residential construction has experienced steady change over the past several decades including larger homes, different home geometries, and a different mix of construction materials. Some of these changes are directly related to the increased use of light-weight engineered floor systems comprised of structural engineered wood I-joists replacing solid-sawn 2"×10" wood joists. Wood I-joists are made of upper and lower horizontal components called the upper and lower flanges and a vertical section called a 'web,' which is between the flanges. The flanges are typically made from laminated veneer lumber or laminated structural lumber. The web is typically made from oriented strand board, a structural panel made with layers of thin, rectangular strands of wood produced by a cutting machine called a strander. The wood strands are mixed with adhesives and glued under heat and pressure to the desired panel thickness.

There has been on-going debate regarding the safety of these engineered wood-based systems under fire conditions, specifically pertaining to occupant evacuation and emergency responder entry. Under fire conditions, due to burn-through of the web, I-joists tend to lose strength quickly, leading to joist failure and floor collapse. Recent building code revisions (specifically the 2012 and 2015 IRC code revisions, 501.3 and 302.13 respectively) mandate the use of sprinkler systems or other approved floor assemblies demonstrating equivalent fire performance compared with 2"×10" solid wood as measured by ASTM E119 and/or ASTM E-84 test results as well as the ICC Evaluation Service approval criteria for coatings.

A flame retardant coating is one of the easiest and most efficient ways to protect materials against fire. These coatings do not cause chemical modification of the substrate, but rather the formation of a protective layer which alters the heat flux to the substrate and can inhibit its thermal degradation, ignition, or combustion. Intumescent coatings are commonly used as flame retardants. Intumescent coatings expand under the influence of heat to form a multicellular charred layer which acts as an insulating barrier. The intumesced char can expand up to 50 times the original thickness of the applied coating. It can insulate the substrate and can give additional time before the substrate reaches a critical temperature at which it loses its load bearing capacity. This extra time can allow for evacuation of occupants in the building and a chance for emergency responders to control the fire. However, many intumescent coatings are designed to be used with steel substrates and may not be suitable for use with wood. Therefore, intumescent coatings suitable for use with I-joists and other wood substrates which meet the required fire retardancy standards and approval criteria, would be desirable.

SUMMARY OF THE INVENTION

In one broad embodiment of the invention, there is disclosed a composition comprising, consisting of, or consisting essentially of: a) a first expandable graphite compound having a mean particle size in the range of from 300 microns to 1000 microns; b) a second expandable graphite compound having a mean particle size in the range of from 0.5 microns to 250 microns; with a first expandable graphite compound to second expandable graphite compound weight ratio in the range of from 4:1 to 1:4; c) a binder comprising: i) a thermoplastic compound and ii) a thermoset compound with a thermoplastic compound to thermoset compound weight ratio in the range of from 10:1 to 1:3; d) a catalyst; and e) a blowing agent.

DETAILED DESCRIPTION OF THE INVENTION

Embodiments of the invention are directed to a coating composition, methods for making the coating composition, and the use of the coating composition with wood substrates. In various embodiments, the coating composition is an intumescent coating composition. Intumescent coating compositions are substances that expand as a result of heat exposure, thus increasing in volume and decreasing in density.

The intumescent coating composition comprises, consists of, or consists essentially of a) a first expandable graphite compound having a mean particle size in the range of from 300 microns to 1000 microns; b) a second expandable graphite compound having a mean particle size in the range of from 0.5 microns to 250 microns, with a first expandable graphite compound and the second expandable graphite compound weight ratio in the range of from 4:1 to 1:4; c) a binder comprising i) a thermoplastic compound; and ii) a thermoset compound, with a thermoplastic compound to thermoset compound weight ratio in the range of from 10:1 to 1:3; d) a catalyst; and e) a blowing agent.

Expandable graphite is a synthesized intercalation compound of graphite that expands when heated. Expandable graphite is formed by treating crystalline graphite, which is composed of stacks of parallel planes of carbon atoms, with intercalants such as sulfuric acid and nitric acid. Since no covalent bonding exists between the planes of the carbon atoms, the intercalant can be inserted between them. This allows the intercalant to be positioned within the graphite lattice. When the intercalated graphite is exposed to heat or flame, the inserted molecules decompose and release gases. The graphite layer planes are pushed apart by the gas and the graphite expands up to 300 times its original thickness, its bulk density is lowered, and its surface area is increased. This results in a low-density thermal insulation layer. Expandable graphite can also be referred to as expandable flake graphite, intumescent flake graphite, or expandable flake.

Commercially available examples of expandable graphite include, but are not limited to NYAGRAPH® 35, NYAGRAPH® 251, NYAGRAPH® 351 (NYACOL® Nano Technologies, Inc., Ashland, Mass.), and GRAFGUARD® 160-50N (GrafTech International, Brooklyn Heights, Ohio).

Typically, expandable graphite can be available in a variety of particle size distributions. This varies with the manufacturer and grade. For example, NYAGRAPH® 251 has a particle distribution of the following: below 150 microns—1-5%, 150 microns-300 microns: 9-15%, 300 microns-710 microns: 79-85%, and over 710 microns: 1-5%.

The first expandable graphite compound generally has a mean particle size in the range of from 300 microns to 1000 microns. Any and all mean particle size ranges between 300 microns and 1000 microns are included herein and disclosed herein; for example, the first expandable graphite compound can have a mean particle size in the range of from 375 microns to 950 microns, in the range of from 400 microns to 800 microns, or in the range of from 450 microns to 600 microns.

The second expandable graphite compound generally has a mean particle size in the range of from 0.5 microns to 250 microns. Any and all mean particle size ranges between 0.5 microns and 250 microns are included herein and disclosed herein; for example, the second expandable graphite compound can have a mean particle size in the range of from 20 microns to 200 microns, in the range of from 40 microns to 175 microns, or in the range of from 75 microns to 150 microns.

The first expandable graphite compound to second expandable graphite compound weight ratio is generally in the range of from 4:1 to 1:4. Any and all ranges between 4:1 and 1:4 are included herein and disclosed herein; for example, the first expandable graphite compound to second expandable graphite compound weight ratio can be in the range of from 3:1 to 1:3, from 2:1 to 1:2, or from 1.5:1 to 1:1.5.

The expandable graphite as a whole (comprising both the first and second expandable graphite compounds), is generally present in the composition in the range of from 1 weight percent to 50 weight percent, based on the total weight of the composition. Any and all ranges between 1 weight percent and 50 weight percent are included herein and disclosed herein; for example, the expandable graphite can be present in the composition in the range of from 5 weight percent to 40 weight percent, or from 5 weight percent to 30 weight percent.

The composition also contains a binder comprising at least one thermoplastic compound and at least one thermoset compound. Binders can perform several functions in intumescent coatings. The binder can act as a matrix in which the other components of the composition are dispersed. The binder can also bind the coating to the substrate. Additionally, the binder can contribute to the insulating char layer formed by the expansion of the composition.

The thermoplastic compound is generally present as a dispersion. The dispersion can be prepared by any suitable method known to those skilled in the art. In various embodiments, the dispersion is prepared via an emulsion.

Examples of thermoplastic compounds that can be used include, but are not limited to polyvinyl acetate, poly(methyl (meth)acrylate), poly(ethyl (meth)acrylate), poly(n-butyl (meth)acrylate), poly(isobutyl (meth)acrylate), poly(tert-butyl (meth)acrylate), poly(2-hydroxyethyl (meth)acrylate), poly (2-hydroxypropyl (meth)acrylate), poly(2-ethylhexyl (meth)acrylate), and combinations thereof.

Examples of thermoset compounds that can be used include, but are not limited to phenol formaldehyde, urea formaldehyde, melamine formaldehyde, melamine reinforced urea formaldehyde, isocyanate reinforced urea formaldehyde resin, resorcinol formaldehyde resin, polyacrylic latex resin, isocyanate resin, an organopolysiloxane, ethylene glycol, bisphenol-A epoxy resins, bisphenol-F epoxy resins, unsaturated polyesters, and combinations thereof.

The thermoset compound is optionally present in the composition as a dispersion. The thermoset dispersion can be prepared by any suitable method known to those skilled in the art.

The binder is generally has a thermoplastic compound to thermoset compound weight ratio in the range of from 10:1 to 1:3. Any and all weight ratios between 10:1 and 1:3 are included herein and disclosed herein; for example, the binder can have a thermoplastic compound to thermoset compound weight ratio in the range of from 8:1 to 1:2.5, from 6.5:1 to 1:2, from 6:1 to 1:1.5, or from 5:1 to 1:1.

The binder is generally present in the composition in the range of from 10 weight percent to 80 weight percent. Any and all weight percent ranges from 10 weight percent to 80 weight percent are included herein and disclosed herein; for example, the binder can be present in the composition in the range of from 25 weight percent to 70 weight percent, or from 30 weight percent to 65 weight percent.

Catalysts are useful to assist with the intumescent expansion of the composition. Catalyst examples include, but are not limited to perchloric acid, hydroiodic acid, hydrobromic acid, sulfuric acid, hydrochloric acid, nitric acid, sulfurous acid, phosphoric acid, nitrous acid, sulfonic acid, hydrochloric acid, sulfuric acid, phosphoric acid, formic acid, acetic acid, maleic acid, malic acid, tartaric acid, citric acid, ammonium phosphates, metal phosphates, paratoluene sulfonic acid, and combinations thereof.

The catalyst is generally present in the composition in the range of from 0.5 weight percent to 20 weight percent, based on the total weight of the composition. Any and all ranges between 0.5 weight percent and 20 weight percent are included herein and disclosed herein; for example, the catalyst can be present in the composition in the range of from 1 weight percent to 15 weight percent, or from 2 weight percent to 10 weight percent.

The composition also contains a blowing agent. The blowing agent is useful for expanding the binder in order to increase the thickness of the composition. The blowing agent can also dilute the concentrations of combustible gasses that are released when a wood substrate burns. Examples of blowing agents that can be used include, but are not limited to melamine, urea, butyl urea, alumina trihydrate, dicyandiamide, benzene sulfonyl-hydrazide, azobisisobutyronitrile, 1,1-azobisformamide, 4,4' oxybis(benzene sulfonhydrazide), dinitroisopentamethylene tetraamine, and combinations thereof. In various embodiments, the melamine used can be Melafine® by OCI Nitrogen.

The blowing agent is generally present in the composition in the range of from 1 weight percent to 20 weight percent, based on the total weight of the composition. Any and all ranges between 1 weight percent and 20 weight percent are included herein and disclosed herein; for example, the blowing agent can be present in the composition in the range of from 2 weight percent to 15 weight percent, or from 3 weight percent to 10 weight percent.

The composition can also contain a wide variety of optional components. Such optional components include, but are not limited to toxic gas absorbing materials, absorbent promoters, wetting agents, nucleating agents, accelerators, fillers, buffers, reinforcing additives, surfactants, pigments, defoamers, and thickeners.

To prepare the composition, the expandable graphite, catalyst, blowing agent, thermoplastic compound, and thermoset compound are mixed together in any order, combination, or sub-combination. Optional components can also be added to the mixture.

The intumescent coating composition can be used to coat substrates, particularly wood substrates such as solid lumber, particle board, plywood, medium density fiberboard, hardboard, parallel strand lumber, oriented strand board, and strawboard. The intumescent coating composition can be coated to the substrate in any suitable manner. Examples of coating methods include, but are not limited to brush coating, spray coating, roller coating, and curtain coating. If desired, the composition can be used in combination with other fire-retardant systems. The composition can be used in residential and commercial applications such as roofing, walls, floors, I-joists, underlayment, and siding.

EXAMPLES

In order that those skilled in the art may more fully understand the invention presented herein, the following procedures and examples are set forth. The components used included the following:

DISPERBYK-190: a dispersing additive for aqueous coating systems, supplied by BYK Additives & Instruments.

Nyacol® Nyagraph 251: expandable graphite supplied by Nano Technologies, Inc. Its typical particle size distribution is: below 150 µm: 1-5%, 150 µm-300 µm: 9-15%, 300 µm-710 µm: 79-85%, and over 710 µm: 1-5%.

Nyacol® Nyagraph 35: expandable graphite supplied by Nano Technologies, Inc. Its typical particle size distribution is: below 45 µm: 15-25%, 45 µm-75 µm: 20-25%, 75 µm-150 µm: 35-50%, 150 µm-180 µm: 9-15%, 180 µm-300 µm: 1-5%, and over 300 µm: 0%.

Melafine®: melamine with particle size of less than 40 microns, supplied by OCI Nitrogen.

Exolit AP 422: a fine-particle ammonium polyphosphate, supplied by Clariant.

BYK-037: a volatiles-free, silicone-containing defoamer based on mineral oil, supplied by BYK Additives & Instruments.

Natrosol™ 250 HR: a thickener supplied by Ashland Specialty Chemical.

Multibond 1P2: a crosslinking polyvinyl acetate supplied by Franklin Adhesives and Polymers.

XB-91MO: a phenolic thermoset compound supplied by Hexion Inc.

NX 795: coalescing agent for latex formulations, supplied by Perstorp.

Thixol 53L: a liquid acrylic thickener supplied by Coatex.

Rheotech™ 3800: a thickener supplied by Coatex.

The components used in the intumescent coating formulation Examples 1-4 are shown in Tables 1-4, below.

TABLE 1

Formulation for Intumescent Coating - Comparative Example 1

|  | Ingredients | Parts by weight |
| --- | --- | --- |
| Part I | | |
| Water | Water | 19.8 |
| Dispersant | Disperbyk 190 | 0.84 |
| Pigment | Calcium Carbonate | 8.36 |
| Expandable graphite | Nyagraph 251 | 16.72 |
| Blowing agent | Melafine | 4.18 |
| Catalyst | Exolit AP 422 | 8.36 |
| Defoamer | Byk 037 | 0.21 |
| Thickener | Natrosol Hr 250, 2% | 0.2 |
| Part II | | |
| Water | Water | 3.40 |
| Binder | Multibond 1P2 | 34.65 |
| Coal. agent | NX 795 | 1.09 |
| Water softener | Sodium Polyphosphate, 10% | 0.63 |
| Thickener | Thixol 53L | 1.00 |

TABLE 2

Formulation for Intumescent Coating - Comparative Example 2

|  | Ingredients | Parts by weight |
| --- | --- | --- |
| Part I | | |
| Water | Water | 19.8 |
| Dispersant | Disperbyk 190 | 0.84 |
| Pigment | Calcium Carbonate | 8.36 |
| Expandable graphite | Nyagraph 251 | 16.72 |
| Blowing agent | Melafine | 4.18 |
| Catalyst | Exolit AP 422 | 8.36 |
| Defoamer | Byk 037 | 0.21 |
| Thickener | Natrosol Hr 250, 2% | 0.2 |
| Part II | | |
| Water | Water | 3.40 |
| Binders | Multibond 1P2 | 28.96 |
|  | XB-91MO | 7.27 |
| Coal. agent | NX 795 | 1.09 |
| Water softener | Sodium Polyphosphate, 10% | 0.63 |
| Thickener | Thixol 53L | 1.00 |

TABLE 3

Formulation for Intumescent Coating - Comparative Example 3

|  | Ingredients | Parts by weight |
| --- | --- | --- |
| Part I | | |
| Water | Water | 19.8 |
| Dispersant | Disperbyk 190 | 0.84 |
| Pigment | Calcium Carbonate | 8.36 |
| Expandable graphite | Nyagraph 251 | 8.36 |
|  | Nyagraph 35 | 8.36 |
| Blowing agent | Melafine | 4.18 |
| Catalyst | Exolit AP 422 | 8.36 |
| Defoamer | Byk 037 | 0.21 |
| Thickener | Natrosol Hr 250, 2% | 0.2 |
| Part II | | |
| Water | Water | 3.40 |
| Binder | Multibond 1P2 | 34.65 |
| Coal. agent | NX 795 | 1.09 |
| Water softener | Sodium Polyphosphate, 10% | 0.63 |
| Thickener | Thixol 53L | 1.00 |

TABLE 4

Formulation for Intumescent Coating - Inventive Example 4

|  | Ingredients | Parts by weight |
| --- | --- | --- |
| Part I | | |
| Water | Water | 19.8 |
| Dispersant | DISPERBYK 190 | 0.84 |
| Pigment | Calcium Carbonate | 8.36 |
| Expandable graphite | Nyagraph 251 | 8.36 |
|  | Nyagraph 35 | 8.36 |
| Blowing agent | Melafine | 4.18 |
| Catalyst | Exolit AP 422 | 8.36 |
| Defoamer | BYK037 | 0.21 |
| Thickener | Natrosol 250 HR, 2% | 0.2 |
| Part II | | |
| Water | Water | 3.40 |
| Binders | Multibond 1P2 | 28.96 |
|  | XB-91MO | 7.27 |
| Coal. agent | NX 795 | 1.09 |

TABLE 4-continued

Formulation for Intumescent Coating - Inventive Example 4

| | Ingredients | Parts by weight |
|---|---|---|
| Water softener | Sodium Polyphosphate, 10% | 0.63 |
| Thickener | Thixol 53L | 1.00 |

Preparation of Formulations

The materials from Part I were charged to a vessel while mixing. The mixture was covered with plastic or wax paper and was allowed to stand for one hour for the mixture to reach equilibrium. The mixture was then gently mixed to form a suspension. The suspension was then ground using a Dispermat at 3500 rpm for 20 minutes. After the grinding was completed, the materials from Part II were then charged to the vessel while mixing. The pH and viscosity were then measured. If necessary, the pH was adjusted to above 8.5. The mixture was then thickened with Rheotech 3800 rheology improver to achieve the desired thickness.

Testing

OSB boards (43 inches×43 inches) were coated with the intumescent coating using draw-down or spray coating methods The coated boards were air dried to the touch and then put into an oven at 60° C. for 2-12 hours in order to cure the thermoset component in the coating.

The coated boards were tested for effectiveness using the ASTM E1623 test method. The results are shown in Table 5, below.

TABLE 5

Comparison of Burn-Through Time Between Different Intumescent Coating Formulations

| | Coating formulation | | Time to | Char layer | Char layer | Pass or fail (minimum burn- |
|---|---|---|---|---|---|---|
| Sample | Expandable graphites | Polymeric binder | burn-through (minutes) | thickness (inch) | detached from substrate | through time 40 minutes) |
| Example 1 | One size | Polyvinyl Acetate | 13 | 1.5 | Yes | Fail |
| Example 2 | One size | Polyvinyl Acetate & Phenolic blend | 26 | 1.5 | No | Fail |
| Example 3 | Two different particle sizes blended | Polyvinyl Acetate | 28 | 1.5 | Yes | Fail |
| Example 4 | Two different particle sizes blended | Polyvinyl Acetate & Phenolic blend | 58 | 1.5 | No | Pass |

As can be seen in Table 5 above, Example 4 had the highest time to burn-through and was also the only coating formulation that was able to meet the minimum standard of 40 minutes to burn-through.

While the present invention has been described and illustrated by reference to particular embodiments and examples, those of ordinary skill in the art will appreciate that the invention lends itself to variations not necessarily illustrated herein.

The invention claimed is:

1. A composition comprising:
   a) a first expandable graphite compound having a mean particle size in the range of from 300 microns to 1000 microns;
   b) a second expandable graphite compound having a mean particle size in the range of from 0.5 microns to 250 microns with a first expandable graphite compound to second expandable graphite compound weight ratio in the range of from 4:1 to 1:4;
   c) a binder comprising:
      i) a thermoplastic compound; and
      ii) a thermoset compound with a thermoplastic compound to thermoset compound weight ratio in the range of from 10:1 to 1:3;
   d) a catalyst; and
   e) a blowing agent.

2. A composition in accordance with claim 1 wherein the first expandable graphite compound and second expandable graphite compound are present in a combined amount in the range of from 1 weight percent to 50 weight percent, based on the total weight of the composition.

3. A composition in accordance with claim 1 wherein the binder is present in the range of from 10 weight percent to 80 weight percent, based on the total weight of the composition.

4. A composition in accordance with claim 1 wherein the thermoplastic compound is selected from the group consisting of polyvinyl acetate, poly(methyl (meth)acrylate), poly (ethyl (meth)acrylate), poly(n-butyl (meth)acrylate), poly (isobutyl (meth)acrylate), poly(tert-butyl (meth)acrylate), poly(2-hydroxyethyl (meth)acrylate), poly (2-hydroxypropyl (meth)acrylate), poly(2-ethylhexyl (meth)acrylate), and combinations thereof.

5. A composition in accordance with claim 1 wherein the thermoset compound is selected from the group consisting of phenol formaldehyde, urea formaldehyde, melamine formaldehyde, melamine reinforced urea formaldehyde, isocyanate reinforced urea formaldehyde resin, resorcinol formaldehyde resin, polyacrylic latex resin, isocyanate resin, an organopolysiloxane, ethylene glycol, bisphenol-A epoxy resins, bisphenol-F epoxy resins, unsaturated polyesters, and combinations thereof.

6. A composition in accordance with claim 1 wherein the blowing agent is selected from the group consisting of melamine, urea, butyl urea, alumina trihydrate, dicyandiamide, benzene sulfonyl-hydrazide, azobisisobutyronitrile, 1,1-azobisformamide, 4,4'oxybis(benzene sulfonhydrazide), dinitroisopentamethylene tetraamine, and combinations thereof.

7. A composition in accordance with claim 1 wherein the blowing agent is present in the range of from 1 weight percent to 20 weight percent, based on the total weight of the composition.

8. A composition in accordance with claim 1 wherein the catalyst is selected from the group consisting of perchloric acid, hydroiodic acid, hydrobromic acid, sulfuric acid, hydrochloric acid, nitric acid, sulfurous acid, phosphoric acid, nitrous acid, sulfonic acid, hydrochloric acid, sulfuric acid, phosphoric acid, formic acid, acetic acid, maleic acid, malic acid, tartaric acid, citric acid, ammonium phosphates, metal phosphates, paratoluene sulfonic acid, and combinations thereof.

9. A composition in accordance with claim 1 wherein the catalyst is present in the range of from 0.5 weight percent to 20 weight percent, based on the total weight of the composition.

10. A wood substrate coated with the composition of claim 1.

11. A wood substrate in accordance with claim 10 wherein the wood substrate is an I-joist.

\* \* \* \* \*